(12) United States Patent
Patole et al.

(10) Patent No.: US 10,809,365 B2
(45) Date of Patent: Oct. 20, 2020

(54) VIBRATION PARAMETERS MONITORING USING FMCW RADAR

(71) Applicant: TEXAS INSTRUMENTS INCORPORATED, Dallas, TX (US)

(72) Inventors: Sujeet Milind Patole, Richardson, TX (US); Anand Dabak, Plano, TX (US); Lei Ding, Plano, TX (US); Murtaza Ali, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 584 days.

(21) Appl. No.: 14/833,916

(22) Filed: Aug. 24, 2015

(65) Prior Publication Data
US 2016/0054438 A1 Feb. 25, 2016

Related U.S. Application Data

(60) Provisional application No. 62/041,266, filed on Aug. 25, 2014.

(51) Int. Cl.
*G01S 13/36* (2006.01)
*G01S 7/35* (2006.01)
*G01S 13/34* (2006.01)

(52) U.S. Cl.
CPC .......... *G01S 13/36* (2013.01); *G01S 7/35* (2013.01); *G01S 13/343* (2013.01); *G01S 2007/356* (2013.01)

(58) Field of Classification Search
CPC .......... G01S 13/36; G01S 7/35; G01S 13/343; G01S 2007/356; G01S 7/28; G01S 13/34;
(Continued)

(56) References Cited

U.S. PATENT DOCUMENTS 3,710,082 A * 1/1973 Sloane ................ G01M 7/022
700/280
4,546,354 A * 10/1985 Boles ................ G01S 13/9023
342/179
(Continued)

FOREIGN PATENT DOCUMENTS

EP 1203966 A2 * 5/2002 ............ G01S 19/49
EP 1841256 A1 * 10/2007 ............ G01S 5/02
(Continued)

OTHER PUBLICATIONS

Wang, Guachao, et al., Application of Linear-Frequency-Modulated Continuous-Wave (LFMCW) Radars for Tracking of Vital Signes, IEEE Transactions on Microwave Theory and Techniques, vol. 62, No. 6, Jun. 2014, pp. 1387-1399 (13 pages).

*Primary Examiner* — Bernarr E Gregory
*Assistant Examiner* — Nuzhat Pervin
(74) *Attorney, Agent, or Firm* — Ebby Abraham; Charles A. Brill; Frank D. Cimino

(57) ABSTRACT

A frequency modulated continuous wave (FMCW) radar system that includes a transceiver coupled to an analog to digital converter (ADC), and a digital signal processor (DSP) coupled to the ADC. The transceiver is configured to transmit a plurality of FMCW chirps, receive a plurality of reflected FMCW chirps, and mix the plurality of reflected FMCW chirps with at least one of the FMCW chirps to generate a plurality of beat signals. The reflected FMCW chirps are the FMCW chirps after being reflected off of a target object. The ADC is configured to convert the beat signals into a plurality of digital chirps. The DSP is configured to receive the digital chirps and quantify a plurality of vibration parameters for the target object based on a comparison of phase information in a frequency domain between
(Continued)

one of the plurality of FMCW chirps and one of the plurality of digital chirps.

19 Claims, 3 Drawing Sheets

(58) Field of Classification Search
CPC ............... G01S 13/9023; G01S 7/4021; G01S 13/5242; G01S 7/025; A61B 5/1113; G02B 27/2264; F41H 11/02; G01J 3/45
USPC .......................................................... 342/127
See application file for complete search history.

(56) References Cited

U.S. PATENT DOCUMENTS

| | | | | |
|---|---|---|---|---|
| 4,549,184 A * | 10/1985 | Boles | ................... | F41G 5/18 342/25 B |
| 4,568,939 A * | 2/1986 | Grau | ................... | G01S 13/5242 342/104 |
| 5,109,188 A * | 4/1992 | Sanderson | ............. | G01R 23/16 324/76.35 |
| 5,323,103 A * | 6/1994 | Choate | ................... | G01R 23/16 324/76.21 |
| 5,424,749 A * | 6/1995 | Richmond | ............. | F41H 13/00 342/192 |
| 5,774,829 A * | 6/1998 | Cisneros | ................. | G01S 5/145 342/457 |
| 5,883,594 A * | 3/1999 | Lau | ....................... | G01S 19/252 342/357.63 |
| 6,144,333 A * | 11/2000 | Cho | ....................... | G01S 7/4021 342/149 |
| 6,252,545 B1 * | 6/2001 | Da | ........................... | G01S 19/05 342/357.42 |
| 6,285,316 B1 * | 9/2001 | Nir | ............................ | G01S 1/68 342/357.46 |
| 6,429,809 B1 * | 8/2002 | Vayanos | ................. | G01S 19/09 342/357.23 |
| 6,492,933 B1 * | 12/2002 | McEwan | ............... | G01S 13/582 342/118 |
| 6,591,681 B1 * | 7/2003 | Shimada | ............... | G01N 29/045 73/600 |
| 6,741,202 B1 * | 5/2004 | Krikorian | ........... | G01S 13/9023 342/102 |
| 6,778,136 B2 * | 8/2004 | Gronemeyer | ......... | G01S 19/235 342/357.69 |
| 7,242,481 B2 * | 7/2007 | Shpantzer | .............. | G01H 9/00 356/485 |
| 7,345,619 B2 * | 3/2008 | Hunt | ......................... | G01S 7/40 342/70 |
| 7,580,381 B2 * | 8/2009 | Michelon | ................ | G01S 19/11 342/357.29 |
| 7,786,931 B2 * | 8/2010 | Monnerat | ............. | G01S 19/258 342/357.64 |
| 8,331,422 B2 * | 12/2012 | Weill | ..................... | G01S 19/254 342/357.64 |
| 8,483,717 B2 * | 7/2013 | Sheynblat | ................ | G01S 5/02 455/456.1 |
| 8,614,641 B2 * | 12/2013 | Yule | ....................... | G01S 5/0036 342/357.28 |
| 8,621,931 B2 * | 1/2014 | Phua | ......................... | G01H 9/00 73/596 |
| 8,682,481 B2 * | 3/2014 | Toshima | ............... | G11B 17/225 271/152 |
| 8,682,581 B2 * | 3/2014 | Psiaki | .................... | G01C 21/28 342/357.2 |
| 8,704,707 B2 * | 4/2014 | Riley | ..................... | G01S 5/0236 342/357.25 |
| 8,711,462 B1 * | 4/2014 | Kaiser | .................... | G02B 30/24 359/238 |
| 8,836,573 B2 * | 9/2014 | Yanagihara | ............. | G01S 7/412 342/179 |
| 8,912,953 B2 * | 12/2014 | Jeong | ...................... | G01S 19/42 342/357.28 |
| 9,074,897 B2 * | 7/2015 | Kulik | ................... | G01C 21/165 |
| 9,229,089 B2 * | 1/2016 | Do | .......................... | G01C 21/20 |
| 2004/0257277 A1 * | 12/2004 | Abraham | ............... | G01S 5/0036 342/357.59 |
| 2005/0090266 A1 * | 4/2005 | Sheynblat | ................ | G01S 5/02 455/456.1 |
| 2006/0079782 A1 * | 4/2006 | Beach | ................. | G01S 15/8981 600/450 |
| 2007/0004430 A1 * | 1/2007 | Hyun | ..................... | G01S 5/0236 455/456.1 |
| 2007/0205941 A1 * | 9/2007 | Riley | ..................... | G01S 19/25 342/357.29 |
| 2008/0111728 A1 * | 5/2008 | Stevens | ................... | F41H 11/02 342/14 |
| 2009/0315762 A1 * | 12/2009 | Venkatachalam | ..... | G01S 13/951 342/26 R |
| 2012/0098924 A1 * | 4/2012 | Busch | .................... | G06T 7/194 348/36 |
| 2013/0104661 A1 * | 5/2013 | Klotz | ........................ | G01H 9/00 73/657 |
| 2013/0300573 A1 * | 11/2013 | Brown | ................. | A61B 5/0002 340/870.01 |
| 2015/0098673 A1 * | 4/2015 | Barfoot | .................... | G01V 8/24 385/13 |
| 2015/0185314 A1 * | 7/2015 | Corcos | ..................... | G01S 7/35 342/200 |
| 2016/0230588 A1 * | 8/2016 | Tine | ........................ | G01H 13/00 |

FOREIGN PATENT DOCUMENTS

| | | | | |
|---|---|---|---|---|
| EP | | 2876460 A1 * | 5/2015 | ............ G01S 13/90 |
| KR | 20130099310 A | * | 9/2013 | ........... B60R 21/013 |

* cited by examiner

VIBRATION PARAMETERS MONITORING USING FMCW RADAR

CROSS-REFERENCE TO RELATED APPLICATIONS

The present application claims priority to U.S. Provisional Patent Application No. 62/041,266, filed Aug. 25, 2014, titled "Vibration Parameters Monitoring Using FMCW Nano-Radar," which is hereby incorporated herein by reference in its entirety.

BACKGROUND

Vibration monitoring and analysis is an important tool for the early detection of faults in many different target systems. For example, in motors, a bearing vibration may indicate a crack in the inner or outer ring of the motor. Vibrations in a bridge or building may indicate that structural integrity is compromised. Movement of a human chest may be utilized to generate estimates of respiration and heart rates. In these examples, vibrations are typically measured using contact-based equipment such as mounting an accelerometer directly on the target or other such contact equipment.

Frequency modulated continuous wave (FMCW) radar, sometimes known as continuous wave frequency modulated (CWFM) radar, is a radar system capable of determining distance to a target object. In a FMCW radar system, a modulated (i.e., frequency varied over a fixed period of time) continuous wave signal is transmitted, reflected off of a target object, and received by the system. The received signal is mixed with the transmitted signal to produce a beat signal. Because the frequency difference between the transmitted signal and the received signal increases with time or distance, demodulation of the beat signal provides a distance to the target object.

SUMMARY

The problems noted above are solved in large part by systems and methods for monitoring and quantifying vibration using frequency modulated continuous wave radar. In some embodiments, a frequency modulated continuous wave (FMCW) radar system includes a transceiver coupled to an analog to digital converter (ADC), and a digital signal processor (DSP) coupled to the ADC. The transceiver is configured to transmit a plurality of FMCW chirps, receive a plurality of reflected FMCW chirps, and mix the plurality of reflected FMCW chirps with at least one of the plurality of FMCW chirps to generate a plurality of beat signals. The plurality of FMCW chirps are the plurality of FMCW chirps after being reflected off of a target object. The ADC is configured to convert the plurality of beat signals into a plurality of digital chirps. The DSP is configured to receive the plurality of digital chirps and quantify a plurality of vibration parameters for the target object based on a comparison of phase information in a frequency domain between one of the plurality of FMCW chirps and one of the plurality of digital chirps.

Another illustrative embodiment is a method for quantifying vibration parameters of a target object utilizing FMCW radar. The method may comprise transmitting a plurality of FMCW chirps. The method also comprises receiving a plurality of reflected FMCW chirps after being reflected off the target object. The method also comprises generating a plurality of beat signals corresponding to each of the plurality of reflected FMCW chirps and FMCW chirps. The method also comprises quantifying a plurality of vibration parameters for the target object based on a comparison of phase information in a frequency domain between the plurality of beat signals.

Yet another illustrative embodiment is a digital signal processor that includes a receiving unit, a detection unit coupled to the receiving unit, and a demodulation unit coupled to the receiving unit and detection unit. The receiving unit is configured to receive a plurality of reflected FMCW chirps reflected off of a target object. The detection unit is configured to calculate a range to the target object fast Fourier transform (FFT) for each of a plurality of beat signals corresponding to each of the plurality of reflected FMCW chirps and FMCW chirps, accumulate the range to the target FFTs in a plurality of range bins, calculate a vibration FFT for each of the plurality of beat signals in each of the plurality of range bins, compare a maximum amplitude of the vibration FFT in each of the plurality of range bins to the maximum amplitude of the vibration FFT in each of the other range bins, and select the range bin with the maximum amplitude of vibration FFT for demodulation. The demodulation unit is configured to extract a phase of the range to target FFT across the reflected FMCW chirps in the selected range bin, remove a mean of the phase of the range to target FFT within the selected range bin to generate a displacement of the target object, and quantify a plurality of vibration parameters based on a FFT of the displacement of the target object.

BRIEF DESCRIPTION OF THE DRAWINGS

For a detailed description of various examples, reference will now be made to the accompanying drawings in which.

NOTATION AND NOMENCLATURE

Figure 1:
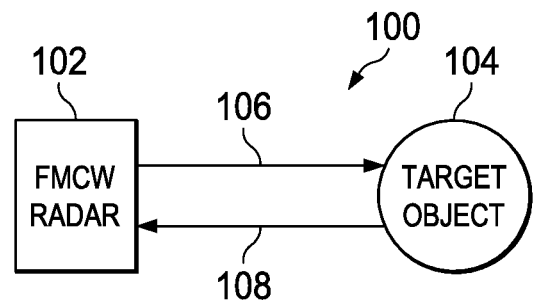
FIG. 1 shows a block diagram of a frequency modulated continuous wave (FMCW) radar system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Frequency modulated continuous wave (FMCW) radar or continuous wave frequency modulated (CWFM) radar, is a radar system capable of determining distance to a target object such as a motor, a bridge, a building structure, or a human chest. In a FMCW radar system, a modulated (i.e., frequency varied over a fixed period of time) continuous wave signal is transmitted, reflected off of the target object, and received by the system. The received signal is mixed with the transmitted signal to produce a beat signal. Because the frequency difference between the transmitted signal and the received signal increases with time or distance, demodulation of the beat signal provides a distance to the target object.

Vibration monitoring and analysis is an important tool for the early detection of faults in many different target systems. For example, in motors, a bearing vibration may indicate a crack in the inner or outer ring of the motor. Vibrations in a bridge or building may indicate that structural integrity is compromised. Movement of a human chest may be utilized to generate estimates of respiration and heart rates. In these examples, vibrations are typically measured using contact-based equipment such as mounting an accelerometer directly on the target or other such contact equipment. However, contact based vibration monitoring systems may not be desirable in some applications. Therefore, it would be desirable to design a non-contact based system, such as a FMCW radar system, that is able to accurately determine vibration parameters of the system.

Vibration of a target object results in a micro-Doppler shift in a reflected FMCW waveform. Thus, instead of the range Doppler processing that is utilized in typical FMCW radar applications, other Doppler characteristics, such as information from the varying phase of the reflected FMCW signal (and/or beat signal) after range gating, is required. The phase information may be obtained by range gating a conjugate mixed reflected FMCW signal and transmitted FMCW signal. By utilizing this phase information, the vibration parameters of the target object may be quantified.

FIG. 1 shows a block diagram of a frequency modulated continuous wave (FMCW) radar system 100 in accordance with various embodiments. FMCW radar system 100 may include FMCW radar 102 and target object 104. FMCW radar 102 is configured to transmit a FMCW chirp 106 directed at target object 104. FMCW chirp 106 may be any signal that sweeps linearly from a lower to a higher frequency or from a higher to a lower frequency. FMCW chirp 106 may be in the form of a sinusoidal wave, a sawtooth wave, a triangle wave, a square wave, or any other type of signal that sweeps linearly from one frequency to either a higher or lower frequency. Reflected FMCW chirp 108 is FMCW chirp 106 after reflecting (or echoing) off of the target object 104. Reflected FMCW chirp 108 is received by FMCW radar 102. FMCW chirp 106 may be repeatedly transmitted by FMCW radar 102. In other words, a plurality of FMCW chirps 106 may be transmitted by FMCW radar 102. Accordingly, a plurality of reflected FMCW chirps 108 is received by FMCW radar 102. In some embodiments, the same number of reflected FMCW chirps 108 is received by FMCW radar 102 as the number of FMCW chirps 106 that are transmitted. Additionally, while only one target object 104 is depicted, two or more target objects 104 may be present in FMCW radar system 100.

Figure 2A:
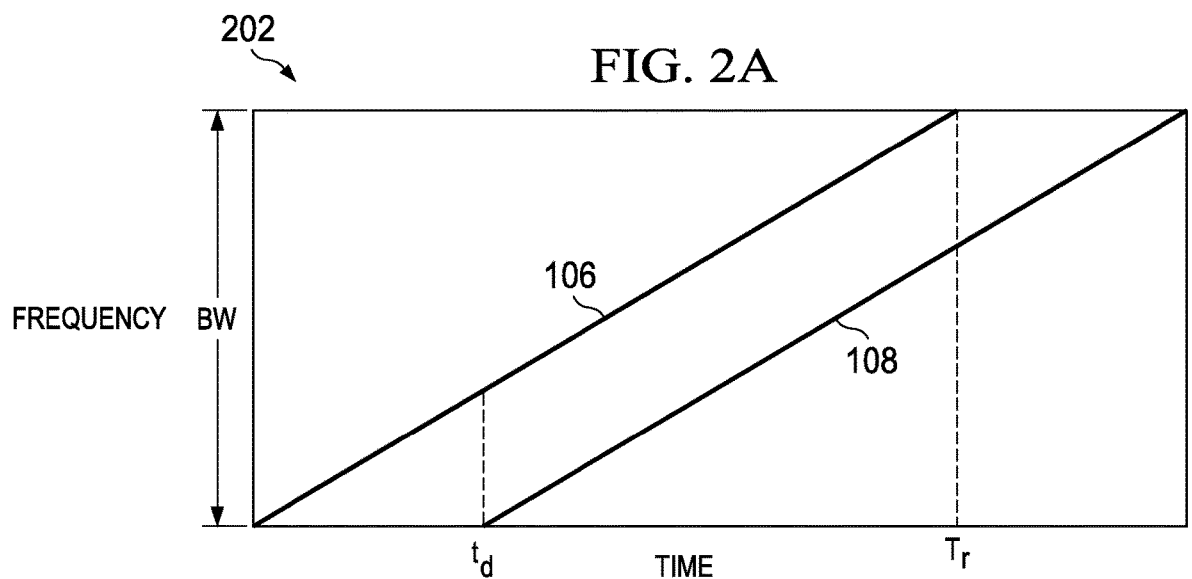
FIG. 2A shows an example frequency versus time graph for a frequency modulated continuous wave (FMCW) chirp and reflected FMCW chirp in accordance with various embodiments.

FIG. 2A shows an example frequency versus time graph 202 for FMCW chirp 106 and reflected FMCW chirp 108 in accordance with various embodiments. In graph 202, FMCW chirp 106 is a linearly sweeping modulated signal that sweeps from a lower frequency to a higher frequency from the time of transmission through ramp time $T_r$ across bandwidth BW. In the example shown in graph 202, the frequency of FMCW chirp 106 increases through the chirp while in alternative embodiments, FMCW chirp 106 may sweep from a higher frequency to a lower frequency. In this example, the slope of modulation for FMCW chirp 106 is:

$$K = \frac{BW}{T_r}.$$

Hence FMCW chirp 106 may be defined as:

$$s(t) = e^{j2\pi(f_c + 0.5Kt)t}$$

which may also be expressed as:

$$s(t) = e^{j(2\pi f_c t + \pi K t^2)}$$

for $0 < t < T_r$ where $f_c$ is the instantaneous frequency at fast time t within FMCW chirp 106. In some embodiments the bandwidth BW for FMCW chirp 106 may be relatively wide (e.g., 1 GHz or 4 GHz). Additionally, FMCW chirp 106 may be transmitted at a relatively high frequency (e.g., 24 GHz or 76 GHz). Thus, FMCW chirp 106 may sweep, for example, from 76 GHz to 80 GHz.

Similar to FMCW chirp 106, reflected FMCW chirp 108 sweeps, in an embodiment, from a lower frequency to a higher frequency from the time of transmission. However, reflected FMCW chirp 108 is displaced in time $t_d$ relative to FMCW chirp 106 by the time it takes to travel from FMCW radar 102 to target object 104 and back to FMCW radar 102. Therefore, reflected FMCW chirp 108 may be defined as:

$$r(t) = e^{j2\pi(f_c + 0.5K(t-t_d))(t-t_d)}$$

which may also be expressed as:

$$r(t) = e^{j(2\pi f_c (t-t_d) + \pi K (t-t_d)^2)}$$

for $0 < t < T_r$ where $f_c$ is the instantaneous frequency at time t.

Figure 2B:
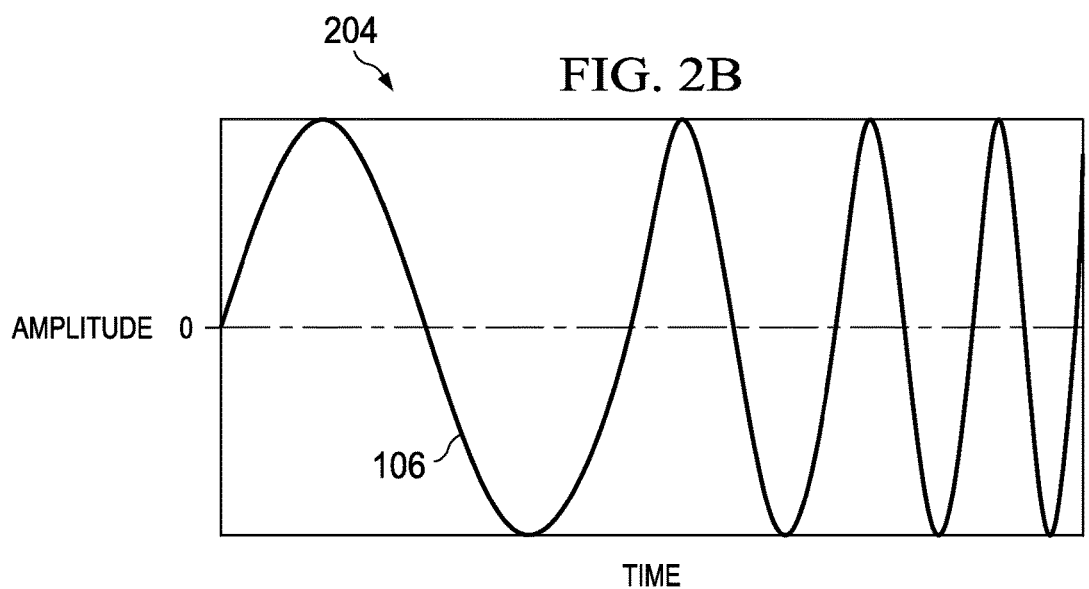
FIG. 2B shows an example amplitude versus time graph for a FMCW chirp and reflected FMCW chirp in accordance with various embodiments.

FIG. 2B shows an example amplitude versus time graph 204 for FMCW chirp 106 and reflected FMCW chirp 108 in accordance with various embodiments. In graph 204, FMCW chirp 106 is a sinusoidal signal that maintains constant amplitude with a linearly increasing frequency. As mentioned previously, in alternative embodiments, FMCW chirp 106 may linearly decrease in frequency and may be a sawtooth wave, a triangle wave, a square wave, or any other type of signal.

Figure 3:
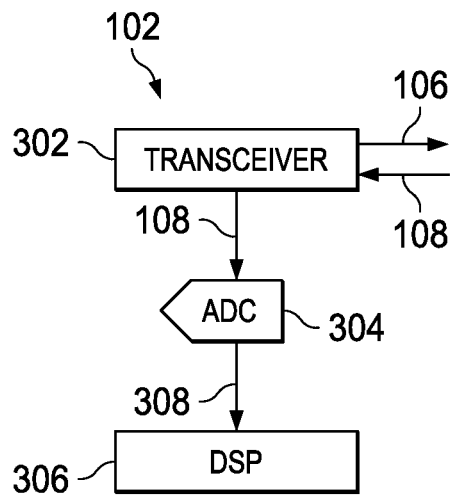
FIG. 3 shows a block diagram of a FMCW radar in accordance with various embodiments.

FIG. 3 shows a block diagram of FMCW radar 102 in accordance with various embodiments. FMCW radar 102 may include a transceiver 302, an analog-to-digital converter (ADC) 304, and a digital signal processor (DSP) 306.

Transceiver 302 is configured to transmit FMCW chirp 106 directed at target object 104 and receive reflected FMCW chirp 108 from target object 104. Transceiver 302 may be any type of transceiver including a wired and/or wireless transceiver capable of transmitting and receiving FMCW chirps. Once the reflected FMCW chirp 108 is received by transceiver 302, the FMCW chirp 106 and reflected FMCW chirp 108 are mixed (i.e., multiplied). In some embodiments, this mixing is performed in the transceiver 302. After the FMCW chirp 106 and reflected FMCW chirp 108 are mixed, an analog filter may be utilized to filter out high frequency content in the mixed signal to create a beat signal b(t).

In some embodiments, the reflected FMCW chirp 108 is mixed with a conjugated version of the FMCW chirp 106 to create the beat signal. This may be termed as complex conjugate mixing. The beat signal may be expressed as:

$$b(t)=s(t)r^*(t).$$

By inserting the definition of s(t) and r(t), the beat signal may be expressed as:

$$b(t) \approx e^{j(2\pi K t_d t + 2\pi f_c t_d)}.$$

Utilizing the time displacement, the beat signal is expressed as:

$$b(t) = e^{j\left(\frac{4\pi K(R+x(t))}{c} + \frac{4\pi f_c(R+x(t))}{c}\right)}$$

where x(t) is the displacement equation describing vibration motion of target object 104 and c is the speed of light. Thus, the beat signal may also be expressed as:

$$b(t) = e^{j2\pi\left(\frac{2K(R+A_v \sin 2\pi f_v t)t}{c} + \frac{2f_c(R+A_v \sin 2\pi f_v t)}{c}\right)}$$

where $\frac{2K(A_v \sin 2\pi f_v t)}{c} t$ and $\frac{2f_c(A_v \sin 2\pi f_v t)}{c}$ are small as compared to $$\frac{2KRt}{c},$$

the beat signal equation may be simplified to (i.e., because the range is much larger than the vibration amplitude, certain terms may be neglected):

$$b(t) = e^{j2\pi\left(\frac{2KRt}{c} + \frac{2KA_v \sin 2\pi f_v t}{c} t + \frac{2f_c A_v \sin 2\pi f_v t}{c} + \frac{2f_c R}{c}\right)} \quad \text{[equation 1]}$$

$$b(t) \approx e^{j2\pi\left(\frac{2KRt}{c} + \frac{2f_c R}{c}\right)}.$$

This beat signal then may be digitized by ADC 304 and the digital beat signal passed to DSP 306 for further processing.

In other embodiments, only real signals are processed physically. In this embodiments, the real components of the transmitted FMCW chirp 106 may be expressed as:

$$s(t)=\text{real}(e^{j(2\pi f_c t + \pi K t^2)})=\cos(2\pi f_c t + \pi K t^2)$$

while the real components of the reflected FMCW chirp 108 may be expressed as:

$$r(t)=\text{real}(e^{j(2\pi f_c(t-t_d)+\pi K(t-t_d)^2)})=\cos(2\pi f_c(t-t_d)+\pi K(t-t_d)^2).$$

The real component of the beat signal (I) may be expressed as I=s(t)*r(t). This real component of the beat signal then may pass through a lowpass filter in order to remove high frequency mixing products or a bandpass filter in order to remove both high frequency mixing products and direct current (DC) frequency components created from the transmission and/or receiving of the FMCW chirp 106 and/or reflected FMCW chirp 108 that may create very low beat frequencies. The real component of the beat signal then may be digitized by ADC 304 and the digital beat signal passed to DSP 306. The imaginary component of the beat signal (Q) may be determined by first phase shifting s(t) by 90 degrees (or $\sin(2\pi f_c t + \pi K t^2)$). Then, s(t) may be multiplied by r(t). This imaginary component may then pass through a lowpass filter to remove high-frequency mixing products or a bandpass filter to remove both high-frequency mixing products and DC frequency components and then digitized by ADC 304.

ADC 304 may include any hardware that converts the analog beat signal into a digital signal for signal processing by DSP 306. ADC 304 is configured to receive the beat signal, which is in the form of an analog signal (i.e., a continuous time and continuous amplitude signal), from transceiver 302 and convert the signal into a digital representation (i.e., a discrete time and discrete amplitude signal) of the analog beat signal. The resulting digital signal, which in FIG. 3 is referred to as digital chirp 308, is then fed to DSP 306 for further processing. Because transceiver 302 may receive a plurality of reflected FMCW chirps 108 which are then mixed to create a plurality of beat signals, ADC 304 may be configured to convert each of the beat signals into a digital chirp 308. Because the beat signal may be represented utilizing complex numbers, in some embodiments, two ADCs 304 are employed in the FMCW radar 102, one to sample for real (I) components of the beat signal and the other to sample imaginary (Q) components of the beat signal. Utilizing the complex outputs of these two ADCs 304 allows for improved signal-to-noise (SNR) ratio of the beat signal. While shown located in FMCW radar 102, in some embodiments, ADC 304 is located at a location outside of FMCW radar 102.

DSP 306 is configured to demodulate the digital chirp 308 (the digitized version of the beat signal) and quantify a plurality of vibration parameters for the target object 104 based on a comparison of phase information in the frequency domain between the FMCW chirp 106 and one of the reflected FMCW chirps 108. Because the target object 104, which in some embodiments is in a fixed position (i.e., is stationary), may vibrate (i.e., oscillate or any other type of periodic motion or is forced from a position or state of equilibrium), the DSP 306 is configured to quantify some of the vibration parameters associated with the vibration (e.g., the vibration frequency, the vibration amplitude, the vibration velocity, the vibration acceleration). While shown located in FMCW radar 102, in some embodiments, DSP 306 is located at a location outside of FMCW radar 102.

In some embodiments, in order to quantify the vibration parameters, DSP 306 may first determine the distance to or range of the fixed target object 104. The range of the target object 104 is:

$$R(t)=R_0+x(t)$$

where $R_0$ is the initial position of the target object 104 and x(t) is the displacement equation describing vibration motion of target object 104. This vibration motion equation may be expressed as:

$$x(t)=m \sin(\omega_m t)$$

where m is the amplitude of the vibration at time t and $\omega_m$ is the frequency of the vibration at time t. Therefore, the vibration motion equation may also be expressed as:

$$x(t) = A_v \sin 2\pi f_v t$$

where $A_v$ is the amplitude of the vibration at time t and $f_v$ is the frequency of vibration at time t. The time displacement of reflected FMCW chirp 108 may be expressed as:

$$t_d = \frac{2(R + x(lT_r))}{c}$$

where R is the range bin of target object 104, $x(lT_r)$ is the vibration motion equation across the ramp time (or a single chirp as $x(lT_r)$ is assumed to be static within the chirp), and c is the speed of light. Therefore, the time displacement of reflected FMCW chirp 108 may also be expressed as:

$$t_d = \frac{2(R + A_v \sin 2\pi f_v lT_r)}{c}.$$

This process may be repeated for subsequent digital chirps 308 received from ADC 304. Thus:

$$R = R + A_v \sin 2\pi f_v lT_r \quad \text{[equation 2]}$$

for $0 \leq l \leq L-1$ where slow time l is the time across the number of chirps being measured. The resulting two dimensional signal across fast time t and slow time l (inserting equation 2 into equation 1 from above), ignoring the small frequency change due to vibration, is:

$$b(t, l) = e^{j2\pi\left(\left(\frac{2KR}{c} + \frac{2KA_v \sin 2\pi f_v lT_r}{c}\right)t + \frac{2f_c R}{c} + \frac{2f_c A_v \sin 2\pi f_v lT_r}{c}\right)}$$

$$b(t, l) \approx e^{j2\pi\left(\frac{2KRt}{c} + \frac{2f_c R}{c} + \frac{2f_c A_v \sin 2\pi f_v lT_r}{c}\right)}.$$

A frequency transform, such as a fast Fourier transform (FFT) on a particular range bin R may be performed (i.e., range gating) such that:

$$b(l) = e^{\frac{j4\pi f_c (R + A_v \sin 2\pi f_v lT_r)}{c}} \int_0^{T_r} e^{j2\pi\left(\frac{2KR}{c}\right)t} e^{-j2\pi\left(\frac{2KR}{c}\right)t} dt = T_r e^{\frac{j4\pi f_c (R + A_v \sin 2\pi f_v lT_r)}{c}}$$

where $T_r$ is the Fourier gain. This gives DSP 306 the vibration frequency of the target object 104.

In order to quantify the displacement motion of the vibration of target object 104, DSP 306 utilizes the phase of b(l). Thus, $$\phi_l = \frac{4\pi f_c (R + A_v \sin 2\pi f_v lT_r)}{c}$$

where R is the fixed range to the target object 104 and $A_v \sin 2\pi f_v lT_r$ is the vibration signature of the target object 104. While there may be a phase change caused by the reflection surface of target object 104, this phase change (i.e., the phase change caused by the reflection surface of the target object 104) is usually fairly static. Because R is fixed, the mean of the phase angles across slow time l is subtracted from varying phase $\phi_l$ and a constant is multiplied by the result to determine the displacement signal across slow time l:

$$x(l) = \frac{\lambda}{4\pi}(\phi_l - \text{mean } \phi_l).$$

The velocity v(l) and acceleration a(l) of the vibration then may be obtained by DSP 306 by differentiating the displacement signal:

$$v(l) = \dot{x}(l)$$

$$a(l) = \ddot{x}(l).$$

In this way, DSP 306 may quantify various vibration parameters. By utilizing the phase of the reflected FMCW chirp 108, as represented by digital chirp 308, less samples of reflected FMCW chirps 108 are required to accurately determine displacement velocity and acceleration than if only short term Fourier transforms are utilized due to time frequency resolution trade off.

If there are multiple target objects 104 in which vibration parameters are to be quantified by FMCW radar 102, then a similar method may be utilized. The beat frequency of each of the target objects 104 is estimated and demodulated in a manner as discussed above to determine the average phase of each digital chirp 308 received from the multiple target objects 104. A FFT or any other frequency estimation method then may be utilized to estimate the vibration frequencies, amplitudes, and phases of each of the target objects 104. Other vibration parameters then may be quantified as discussed above.

Figure 4:
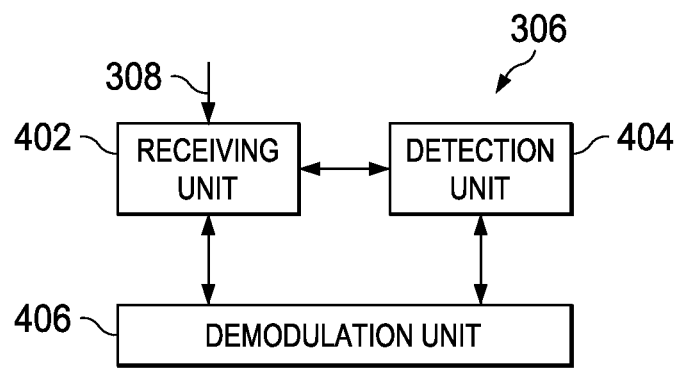
FIG. 4 shows a block diagram of a digital signal processor (DSP) used in a FMCW radar in accordance with various embodiments.

FIG. 4 shows a block diagram of DSP in accordance with various embodiments. DSP 306 may include a receiving unit 402, a detection unit 404, and a demodulation unit 406. The receiving unit 402, detection unit 404, and demodulation unit 406 may be coupled to one another. The receiving unit 402 is configured to receive a plurality of digital chirps 308 from ADC 304. As discussed previously, digital chirps 308 are a digital representation of the beat signal.

Detection unit 404 is configured to calculate the range frequency transform (e.g., a FFT) for each digital chirp 308 received from the ADC 304. This may be accomplished utilizing the algorithms discussed above under FIG. 3. Thus, the range FFT of the target object 104 is calculated for each digital chirp 308. Each of these range FFTs are accumulated and recorded in a plurality of range bins. Detection unit 404 examines the recorded range FFTs across a large number of digital chirps 308 (e.g., 1000 chirps). Detection unit 404 then may also be configured to remove the mean of range FFTs from each of the range bins. For each range bin, the range FFTs undergo another frequency transform (e.g., a FFT) to calculate a vibration FFT. The maximum amplitude of the vibration FFT within each range bin is recorded by detection unit 404. Detection unit 404 then may compare the maximum amplitude value of the vibration FFT for one range bin with the maximum amplitude value of the vibration FFT for each of the remaining range bins. The range bin that has the maximum amplitude of vibration FFT (the range bin that has the largest vibration FFT amplitude) is selected by the detection unit 404 for demodulation.

Demodulation unit 406 may perform the demodulation as discussed above in FIG. 3. The demodulation unit 406 extracts, for the range bin selected by the detection unit 404, the phase of the range FFT output across multiple digital chirps 308. The range FFT output will be previously calculated and recorded in the range bin by the detection unit 404. The mean of the phase angles for the selected bin is removed from the extracted phase generating the displacement motion of vibration of the target object 104. Vibration parameters then may be quantified by the demodulation unit 406. In some embodiments, the velocity and acceleration of the vibration of target object 104 may be quantified by performing derivatives on the displacement motion of vibration. In alternative embodiments, a zoom FFT is performed on the displacement motion of vibration to quantify vibration frequency and amplitude. The velocity and acceleration of the vibration of target object 104 then may be calculated by performing derivatives on the zoom FFT.

For example, demodulation unit 406 may perform demodulation of the digital signal 308 with an estimated frequency $\hat{f}1$ by first multiplying $e^{-j2\pi \hat{f}1 n}$ across index n for each l as:

$$x_{dmod}(n,l) = x(n,l)e^{-j2\pi \hat{f}1 n}.$$

The phase for each digital signal 308 received is then extracted as discussed above, and average phase across index n for each l is determined as:

$$\hat{\phi}(l) = \frac{1}{N}\sum_{n=0}^{N-1} \angle x_{dmod}(n, l)$$

where $\phi_1$, $f_2$, and $\phi_2$ may be determined utilizing a least squares approach as discussed below. The least squares approach may determine these estimates by minimizing the following cost function:

$$J(\phi_1, A_2, f_2, \phi_2) = \sum_{l=0}^{L-1}\left[\hat{\phi}(l) - \phi_1 - A_2\sin(2\pi f_2 l + \phi_2)\right]^2$$

$$J(\phi_1, A_2, f_2, \phi_2) =$$

$$\sum_{l=0}^{L-1}\left[\hat{\phi}(l) - \phi_1 - A_2\cos\phi_2\sin(2\pi f_2 l) - A_2\sin\phi_2\cos(2\pi f_2 l)\right]^2.$$

The cost function becomes quadratic by:

$$\alpha_1 = A_2 \cos \phi_2$$

$$\alpha_2 = A_2 \sin \phi_2.$$

The cost function then may be generated in vector form as:

$$J = (\hat{\phi} - \phi_1 w - \alpha_1 s - \alpha_2 c)^T(\hat{\phi} - \phi_1 w - \alpha_1 s - \alpha_2 c)$$

where:

$$w = [1\ 1\ \ldots\ 1]^T$$

$$s = [0\ \sin(2\pi f_2)\ \ldots\ \sin[2\pi f_2(L-1)]]^T$$

$$c = [0\ \cos(2\pi f_2)\ \ldots\ \cos[2\pi f_2(L-1)]]^T.$$

By defining $H = [w\ s\ c]$ and $\alpha = [\phi_1\ \alpha_1\ \alpha_2]T$, then the vectored cost function may be defined by:

$$J = (\hat{\phi} - H\alpha)^T(\hat{\phi} - H\alpha).$$

The demodulation unit 406 then may minimize the cost function as:

$$\alpha = (H^T H)^{-1} H^T \hat{\phi}.$$

The cost function then may be expressed as:

$$J(\hat{\alpha}) = (\hat{\phi} - H\hat{\alpha})^T(\hat{\phi} - H\hat{\alpha})$$

$$J(\hat{\alpha}) = \hat{\phi}^T\hat{\phi} - \hat{\phi}^T(H^T H)^{-1}H^T\hat{\phi}.$$

Demodulation unit 406 then may generate $\hat{f}_2$ by maximizing the second term of this cost function. The remainder of the parameters then may be determined by demodulation unit 406 utilizing the $\alpha = (H^T H)^{-1} H^T \hat{\phi}$ equation. The parameters then may be utilized by demodulation unit 406 to demodulate the digital signals 308 as discussed above.

In some embodiments, the vibration parameters quantified by demodulation unit 406 in DSP 306, may be presented on a display such that a user has access to the parameters. In alternative embodiments, the DSP 306 may compare the vibration parameters quantified to a set of previously entered threshold values. If one or more of the vibration parameters exceed the corresponding threshold value for the parameter, DSP 306 may detect a fault in the target object 104. The target object 104 then may be corrected. For example, if the target object 104 is a motor and if the velocity vibration parameter exceeds a predetermined threshold value, then a fault (such as a crack in the motor which causes a bearing to vibrate) is detected in the motor. This may be displayed such that a user may take corrective action to fix the fault.

Figure 5:
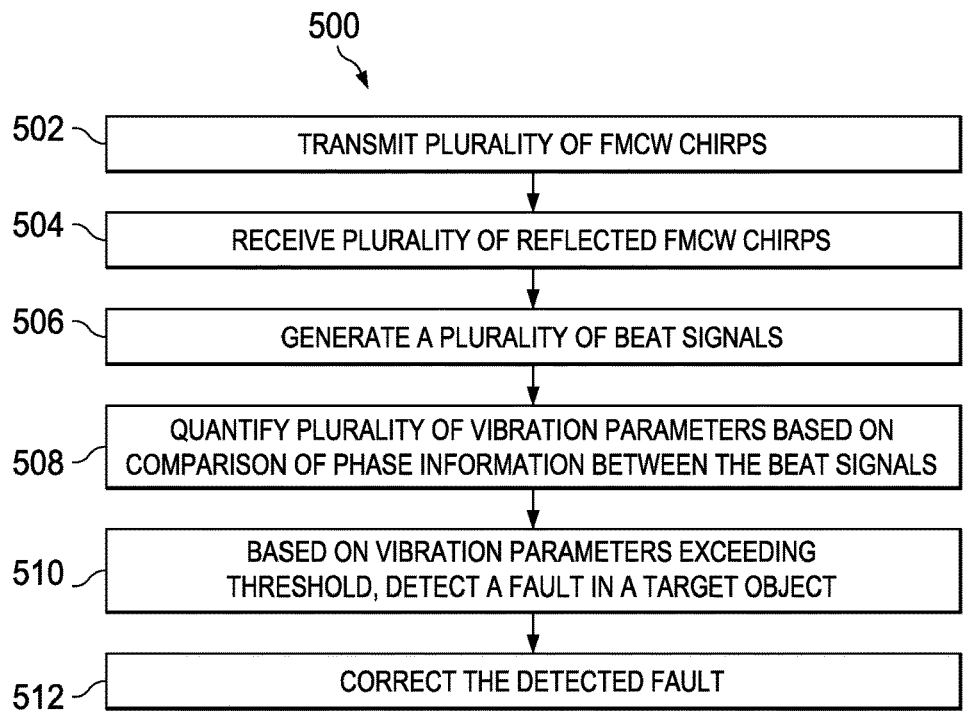
FIG. 5 shows a flow diagram of a method for quantifying vibration parameters of a target object utilizing FMCW radar in accordance with various embodiments.
Figure 6:
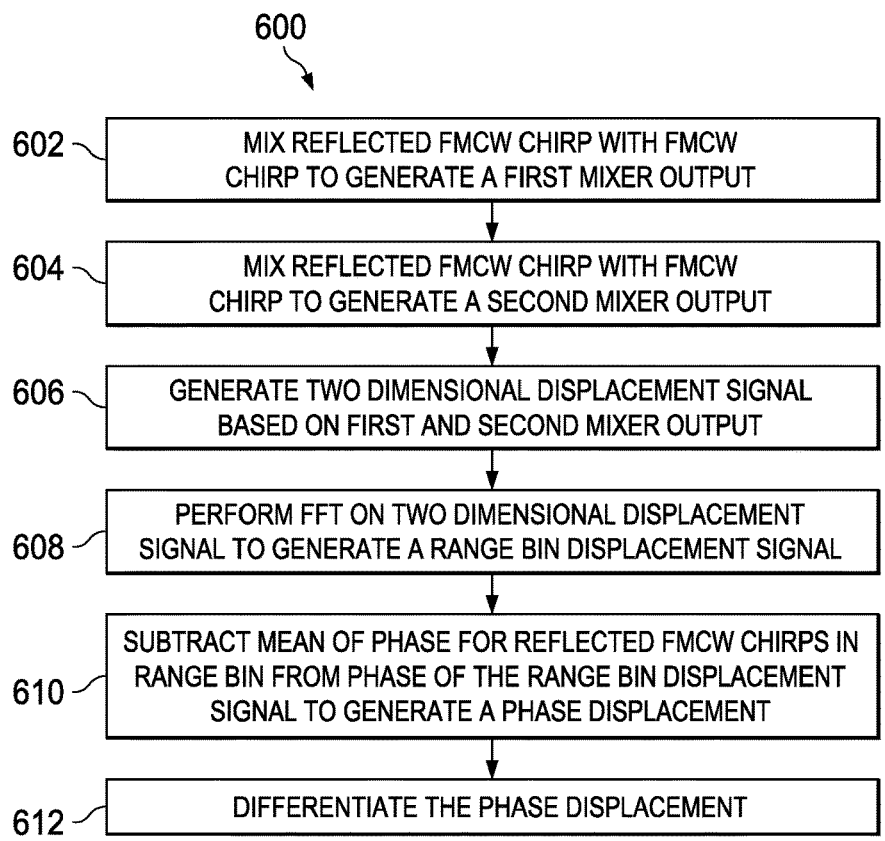
FIG. 6 shows a flow diagram of a method for quantifying vibration parameters of a target object utilizing FMCW radar in accordance with various embodiments.

FIGS. 5 and 6 show flow diagrams of methods 500 and 600 for quantifying vibration parameters of target object 104 utilizing FMCW radar 102 in accordance with various embodiments. Though depicted sequentially as a matter of convenience, at least some of the actions shown in methods 500 and 600 can be performed in a different order and/or performed in parallel. Additionally, some embodiments may perform only some of the actions shown or may perform additional actions. In some embodiments, at least some of the operations of the methods 500 and 600, as well as other operations described herein, can be performed by FMCW radar 102 and/or DSP 306 implemented by a processor executing instructions stored in a non-transitory computer readable storage medium or a state machine.

The method 500 begins in block 502 with transmitting a plurality of FMCW chirps 106 by, in some embodiments, FMCW radar 102. In block 504, the method 500 continues with receiving a plurality of reflected FMCW chirps 108. The reflected FMCW chirps 108 may comprise the plurality of FMCW chirps 106 after being reflected off of target object 104. The target object may be a motor, a bridge, a building, and/or a human chest. The method 500 continues in block 506 with generating a plurality of beat signals corresponding to each of the plurality of reflected FMCW chirps and FMCW chirps. The method 500 continues in block 508 with quantifying a plurality of vibration parameters based on a comparison of phase information between the plurality of beat signals. The plurality of vibration parameters may include vibration frequency of target object 104, vibration amplitude of target object 104, vibration velocity of target object 104, and/or vibration acceleration of target object 104. Based on at least one of the vibration parameters exceeding a threshold value, the method 500 continues in block 510 with detecting a fault in the target object 104. In block 512, the method 500 continues with correcting the fault.

The method 600 begins in block 602 with mixing one of a plurality of reflected FMCW chirps 108 with one of a plurality of FMCW chirps 106 to generate a first mixer output signal. The reflected FMCW chirps 108 may comprise the plurality of FMCW chirps 106 after being reflected off of target object 104. In some embodiments, the FMCW chirp 106 that is mixed may be the analog FMCW chirp 106. Similarly, in some embodiments, the reflected FMCW chirp 108 that is mixed may be the analog reflected FMCW chirp 108. In block 604, the method 600 continues with mixing a second of the reflected FMCW chirps 108 with a second of the plurality of FMCW chirps 106 to generate a second mixer output signal. Like the first FMCW chirp 106 that is mixed, the second FMCW chirp 106 that is mixed may be the analog FMCW chirp 106. Similarly, like the first reflected FMCW chirp 108 that is mixed, the second reflected FMCW chirp 108 that is mixed may be the analog reflected FMCW chirp 108.

The method 600 continues in block 606 with generating a two dimensional displacement signal based on the first and second mixer output signals. In block 608, the method 600 continues with performing a FFT on the two dimensional displacement signal to generate a range bin displacement signal. The method 600 continues in block 610 with subtracting the mean of phase for reflected FMCW chirps 108 that are located in a range bin from the phase of the range bin displacement signal to generate a phase displacement. In block 612, the method 600 continues with differentiating the phase displacement to quantify vibration parameters. The quantified vibration parameters may include vibration velocity of target object 104 and/or vibration acceleration of target object 104.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A frequency modulated continuous wave (FMCW) radar system, comprising:
    a transceiver configured to transmit a plurality of FMCW chirps, receive a plurality of reflected FMCW chirps, and mix the plurality of reflected FMCW chirps with at least one of the plurality of FMCW chirps to generate a plurality of beat signals, the plurality of reflected FMCW chirps comprising the plurality of FMCW chirps after being reflected off of a target object;
    an analog to digital converter (ADC) coupled to the transceiver, the ADC configured to convert the plurality of beat signals into a plurality of digital chirps; and
    a digital signal processor (DSP) coupled to the ADC, the DSP configured to:
        receive the plurality of digital chirps;
        for each of a plurality of range bins, generate a vibration frequency transform of the digital chirps contained in a range bin;
        compare a maximum amplitude of the vibration frequency transform in each range bin of the plurality of range bins to a maximum amplitude of a vibration frequency transform in each other range bin of the plurality of range bins;
        select the range bin with the maximum amplitude of the vibration frequency transform for demodulation; and
        quantify a plurality of vibration parameters for the target object based on a comparison of phase information in a frequency domain between the plurality of digital chirps, the phase information based on the selected range bin.

2. The FMCW radar system of claim 1, wherein the plurality of vibration parameters comprises vibration frequency of the target object, vibration amplitude of the target object, vibration velocity of the target object, and vibration acceleration of the target object.

3. The FMCW radar system of claim 1, wherein the DSP is further configured to generate a range to the target frequency transform for each of the plurality of digital chirps and to accumulate the range to the target frequency transforms in a plurality of pre-defined range bins.

4. The FMCW radar system of claim 1, wherein the DSP comprises a demodulation unit configured to:
    generate a phase of the range to target frequency transform across the digital chirps in the selected range bin;
    remove a mean of the phase of the range to target frequency transform to generate a displacement of the target object; and
    quantify the vibration parameters based on a frequency transform of the displacement of the target object.

5. The FMCW radar system of claim 1, wherein:
    the transceiver is further configured to:
        mix one of the plurality of digital chirps with a conjugated version of one of the plurality of FMCW chirps to generate a first mixer output signal; and
        mix a second of the plurality of digital chirps with the conjugated version of one of the plurality of FMCW chirps to generate a second mixer output signal; and
    the DSP is further configured to:
        generate a two dimensional displacement signal utilizing the first and second mixer output signals; and
        generate a particular range bin displacement signal by taking a frequency transform of the two dimensional displacement signal.

6. The FMCW radar system of claim 5, wherein the DSP is further configured to:
    generate a phase of the particular range bin displacement signal; and
    generate a phase displacement by subtracting a mean of the phase.

7. The FMCW radar system of claim 6, wherein the DSP is further configured to quantify the plurality of vibration parameters by differentiating the phase displacement.

8. The FMCW radar system of claim 5 wherein the frequency transform is a fast Fourier transform.

9. A method for quantifying vibration parameters of a target object utilizing frequency modulated continuous wave (FMCW) radar, comprising:
    transmitting, by an FMCW radar system, a plurality of FMCW chirps;
    receiving, by the FMCW radar system, a plurality of reflected FMCW chirps, the plurality of reflected FMCW chirps comprising the plurality of FMCW chirps after being reflected off of the target object;
    generating, by the FMCW radar system, a plurality of beat signals corresponding to each of the plurality of reflected FMCW chirps and FMCW chirps;
    for each of a plurality of range bins, generating, by the FMCW radar system, a vibration frequency transform of the digital chirps contained in a range bin;
    comparing, by the FMCW radar system, a maximum amplitude of the vibration frequency transform in each range bin of the plurality of range bins to a maximum amplitude of a vibration frequency transform in each other range bin of the plurality of range bins;
    selecting, by the FMCW radar system, the range bin with the maximum amplitude of the vibration frequency transform for demodulation; and
    quantifying, by the FMCW radar system, a plurality of vibration parameters for the target object based on a comparison of phase information in a frequency domain between the plurality of beat signals, the phase information based on the selected range bin.

10. The method of claim 9, further comprising:
    based on one of the plurality of vibration parameters exceeding a threshold value, detecting a fault in the target object; and
    correcting the fault in the target object.

11. The method of claim 10, wherein the target object is a motor, a bridge, a building, or a human chest.

12. The method of claim 9, further comprising:
mixing one of the plurality of reflected FMCW chirps with a conjugated version of one of the plurality of FMCW chirps to generate a first mixer output signal;
mixing a second of the plurality of reflected FMCW chirps with a conjugated version of one of the plurality of FMCW chirps to generate a second mixer output signal;
generating a two dimensional displacement signal based on the first and second mixer output signals;
performing a fast Fourier transform (FFT) on the two dimensional displacement signal to generate a range bin displacement signal for a particular range bin; and
subtracting a mean of phase for the reflected FMCW chirps in the range bin from a phase of the range bin displacement signal to generate a phase displacement.

13. The method of claim 12, further comprising:
differentiating the phase displacement to quantify the vibration parameters.

14. The method of claim 9, wherein the plurality of vibration parameters comprises vibration frequency of the target object, vibration amplitude of the target object, vibration velocity of the target object, and vibration acceleration of the target object.

15. A digital signal processor configured to operate as part of an FMCW radar system, the digital signal processor comprising:
a receiving unit configured to receive a plurality of reflected frequency modulated continuous wave (FMCW) chirps reflected off of a target object;
a detection unit coupled to the receiving unit, the detection unit configured to:
calculate a range to the target object fast Fourier transform (FFT) for each of a plurality of beat signals corresponding to each of the plurality of reflected FMCW chirps;
accumulate the range to the target FFTs in a plurality of range bins;
calculate a vibration FFT for each of the plurality of beat signals in each of the plurality of range bins; and
compare a maximum amplitude of the vibration FFT in each of the plurality of range bins to the maximum amplitude of the vibration FFT in each of the other range bins;
select the range bin with the maximum amplitude of vibration FFT for demodulation; and
a demodulation unit coupled to the receiving unit and detection unit, the demodulation unit configured to:
extract a phase of the range to target FFT across the reflected FMCW chirps in the selected range bin;
remove a mean of the phase of the range to target FFT within the selected range bin to generate a displacement of the target object; and
quantify a plurality of vibration parameters based on a FFT of the displacement of the target object.

16. The digital signal processor of claim 15, wherein the FFT on the displacement of the target object is a zoom FFT.

17. The digital signal processor of claim 15 wherein the plurality of vibration parameters comprises vibration frequency of the target object, vibration amplitude of the target object, vibration velocity of the target object and vibration acceleration of the target object.

18. The digital signal processor of claim 15 wherein the demodulation unit is further configured to quantify the plurality of vibration parameters based on a differentiation of the displacement of the target object.

19. The digital signal processor of claim 15, wherein the target object is a motor, a bridge, a building, or a human chest.

* * * * *